United States Patent [19]

Parkman et al.

[11] Patent Number: 5,505,076
[45] Date of Patent: Apr. 9, 1996

[54] VEHICLE FUEL USAGE TRACKING DEVICE

[75] Inventors: Michael K. Parkman, San Antonio; John W. Whittaker, Seguin; Curtis J. Donaldson, Georgetown, all of Tex.

[73] Assignee: Alternative Fuel Technology Systems, Ltd. Co., San Antonio, Tex.

[21] Appl. No.: 375,923

[22] Filed: Jan. 20, 1995

[51] Int. Cl.⁶ ................................................ G01L 3/26
[52] U.S. Cl. ................................................ 73/113; 73/112
[58] Field of Search .......................... 73/112, 113, 114; 123/27 GE, 525, 526

[56] References Cited

U.S. PATENT DOCUMENTS

| | | | |
|---|---|---|---|
| 4,218,744 | 8/1980 | Pratt et al. | 73/113 |
| 4,400,779 | 8/1983 | Kosuge et al. | 73/114 |
| 4,463,735 | 8/1984 | Stoltman | 123/525 |
| 4,489,699 | 12/1984 | Poehman | 123/525 |
| 4,595,932 | 6/1986 | Ruhl | 346/33 R |
| 4,603,674 | 8/1986 | Tanaka | 123/575 |
| 4,630,292 | 12/1986 | Juricich et al. | 377/20 |
| 4,660,525 | 4/1987 | Mesman | 123/525 |
| 4,663,718 | 5/1987 | Augello et al. | 364/444 |
| 4,949,263 | 8/1990 | Jurca | 364/424.07 |
| 5,228,423 | 7/1993 | Oikawa et al. | 123/525 |
| 5,301,113 | 4/1994 | To et al. | 73/114 |

*Primary Examiner*—Richard Chilcot
*Assistant Examiner*—Max H. Noori
*Attorney, Agent, or Firm*—Gunn, Lee & Miller

[57] ABSTRACT

A device for recording the fuel usage of a vehicle capable of operating on multiple fuel types. The invention is a digital device which tracks time and/or distance parameters for each fuel type burned and stores these parameters in memory. In one embodiment, the device detects when the vehicle engine is running and what type of fuel is being burned. An electronic system clock provides the timing reference for measuring the length of time each fuel type is burned. The memory is periodically updated with the timing information. A second embodiment tracks traveling distance in a similar manner. The user may display the contents of any parameter recorded by the device on a numeric display.

12 Claims, 2 Drawing Sheets

VEHICLE FUEL USAGE TRACKING DEVICE

BACKGROUND OF THE INVENTION

1. Field of the Invention

The present invention relates to a fuel usage tracking device designed to monitor the engine running times for vehicles equipped to utilize more than one type of fuel. Specifically, the fuel usage tracking device allows the user to monitor the total fuel usage and the fuel usage of each type of fuel by determining the total engine running time and the engine running times on each fuel. In an alternative embodiment, the fuel usage tracking device allows the fuel usage of each type of fuel to be monitored by measuring the total distance driven with the vehicle and the distance driven on each type of fuel.

2. Description of the Related Art

Vehicles capable of running on two different types of fuel or "dual fuel vehicles" are known in the art. U.S. Pat. No. 4,463,735, to Stoltman, discloses a dual fuel supply system for automotive engines in which the fuel tank has been adapted to contain both methane and propane at pressures up to 17,000 kPa. Fuel is supplied to the engine from the fuel tank through a fuel metering apparatus via a switching valve and pressure regulator. The pressure inside the fuel tank governs which fuel is utilized by the engine. When the pressure of the fuel tank exceeds 1,400 kPa, the switching valve assembly directs methane through the fuel metering apparatus to the engine and when the pressure of the fuel tank is less than 1,400 kPa, then the switching valve assembly directs propane through the fuel metering apparatus to the engine. This system has an electronic control unit which is used to adjust the operation of the fuel metering apparatus to provide the fuel flow required by the engine. Even though this system is capable of switching between the two fuels, it is not equipped with a timing or a monitoring mechanism which would allow a determination of which fuel is being utilized and the duration of that use.

U.S. Pat. No. 4,603,674, issued to Tanaka, provides another example of a dual fuel engine. This device governs the speed of the engine and controls the switching between two types of fuel (gasoline and diesel fuel). This patent discloses an improvement over conventional devices by electrically switching between the diesel fuel operation mode and the gasoline fuel operation mode using a mode switching control circuit. Conventional devices effected a switch between fuels mechanically by way of a linkage mechanism. The Tanaka device is only concerned with the actual switching between the two types of fuel and fails to provide any means to determine when and how long the engine is running on each type of fuel.

U.S. Pat. No. 4,630,292 to Juracich et al. discloses a device for measuring the running time of an engine and for monitoring the usage of the engine in relation to the movement of the vehicle. The device contains timers which provide an indication of the total running time of the motor, the stationary running time of the vehicle and the in-motion running time of the vehicle. The record generated by this device is used to obtain a rebate of road taxes for fuel used while the engine is running and the vehicle is stationary. This device utilizes a first signal generator which preferably is an oil pressure switch which is activated when the oil pressure reaches a normal operating level. A second signal generator is also used which preferably is a speedometer generator coupled to the drive train of the vehicle. Although this device is capable of measuring engine running times, it does not disclose any mechanism to allow it to distinguish engine running times of the vehicle on different types of fuel. Further, it does not measure the distance traveled by the vehicle.

Although vehicles are presently available which are capable of running on different types of fuel, a problem in the alternative fuel industry is being able to substantiate the fuel usage of each type of fuel in the vehicle. Most conversions of vehicles from gasoline burning to either dual fuel or to dedicated alternative fuel usage vehicles are financed through various public and private funding grants. Because there is an insufficient alternative fuel infrastructure, and more particularly, a shortage of alternative fuel refueling stations, many vehicles which have been converted to dual fuel use continue to operate in part on gasoline.

Most grants funding dual fuel vehicle conversion stipulate that the alternative fuel must be utilized approximately 80–90% of the total vehicle usage. Therefore, operation of a converted vehicle on the alternative fuel for less than this percentage does not satisfy the intent of the providers who have funded the conversion. Grant funders would like to have a verifiable method to substantiate usage other than the honor system. Therefore, there is a need for a device which can be attached to the vehicle and which can accurately verify compliance with the terms of the funding grant. There is currently no device available which can monitor which type of fuel is being burned in an engine of a dual fuel vehicle and cumulatively keep track of this usage.

The present invention provides a device which is capable of monitoring the type of fuel used by a vehicle. The device keeps track of the usage of each fuel type since a last reset as well as the total usage of each fuel type since the device was installed in the vehicle.

SUMMARY OF THE INVENTION

It is an object of the present invention to provide a device which is capable of determining the type of fuel usage of a multiple fuel usage vehicle.

It is an additional object of the present invention to provide a device which is capable of monitoring the running time of the engine of a multiple fuel usage vehicle on each type of fuel.

It is a further object of the present invention to provide a device which is capable of monitoring the distance a multiple fuel usage vehicle has traveled on each type of fuel.

It is an additional object of the present invention to provide a device with an engine fuel sensor to verify the usage of each type of fuel in a multiple fuel usage vehicle.

According to the present invention, the foregoing and other objects and advantages are attained by the device of the present invention which has practical applications in a number of situations. The device of the present invention is initially applicable to a vehicle which runs off of ordinary gasoline and some other, alternative fuel. In order to obtain federal or other funding to convert gasoline running vehicles to alternative fuel burning dual fuel vehicles, the owner of the vehicle often must be able to substantiate that the vehicle will burn the alternative fuel for a certain percentage of its operation. The present invention provides a tamper-resistant means for proving the vehicle's use of the alternative fuel.

The device of the present invention has other applications as well. It may be used by the owner of a fleet of dual fuel use vehicles to monitor and adjust the entire fleet's use of the alternative fuel. Of course, the vehicles equipped with the device need not run gasoline at all, but may run two different sources of alternative fuels. In such a situation, the device would be of value whenever it is necessary to separately track the burning of each of the alternative fuels by the vehicle.

The device of the present invention is an electronic device able to detect, and record to memory, time and/or distance information in association with the type of fuel used by a vehicle able to operate on more than one type of fuel. The device generally comprises a power supply, an electronic system clock, a data storage component, one or more connections to the vehicle which determine when the motor is running, which fuel type has been selected, and which fuel type is being burned, a signal interface for converting analog vehicle signals to digital signals, a microcomputer to interpret the digital signals, a system logic control circuit for coordinating the writing of information to the data storage component, and an external data interface for direct access to the contents of the data stored in memory.

In the preferred embodiment, sixteen different parameters are stored in memory. There are two groups of eight parameters: the first group is made up of time parameters while the second group is made up of distance parameters. The first set of four parameters of each group may be reset by the 1 user, whereas the last set of four parameters in each group are cumulative and may not be altered by the user. These parameters are summarized below in Table 1.

TABLE 1

Set 1 - Resettable Time Parameters a. time traveled on a first type of fuel
b. time traveled on an alternative fuel
c. total time with engine running
d. total elapsed time since the last reset Set 2 - Cumulative Time Parameters a. total time traveled on a first type of fuel since the device was installed
b. total time traveled on an alternative fuel since the device was installed
c. total time with engine running since the device was installed
d. total elapsed time since the device was installed Set 3 - Resettable Distance Parameters a. distance traveled on a first type of fuel
b. distance traveled on an alternative fuel
c. total distance traveled with the engine running
d. total distance since the last reset Set 4 - Cumulative Distance Parameters a. total distance traveled on a first type of fuel since the device was installed
b. total distance traveled on an alternative fuel since the device was installed
c. total distance traveled with the engine running since the device was installed
d. total distance traveled since the device was installed The device has the additional capability of having any of the information stored in memory, including the cumulative values, changed or reset to zero through the external data interface. The device has a numeric display which shows the values of the parameters stored in memory and a user selection switch which allows the user to cycle through and view any of the parameters stored by the device.

Still other objects and advantages of the present invention will become readily apparent to those skilled in this art from the following detailed description, wherein multiple preferred embodiments of the invention are shown and described, simply by way of illustration of the best mode contemplated by the inventor for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

Figure 1:
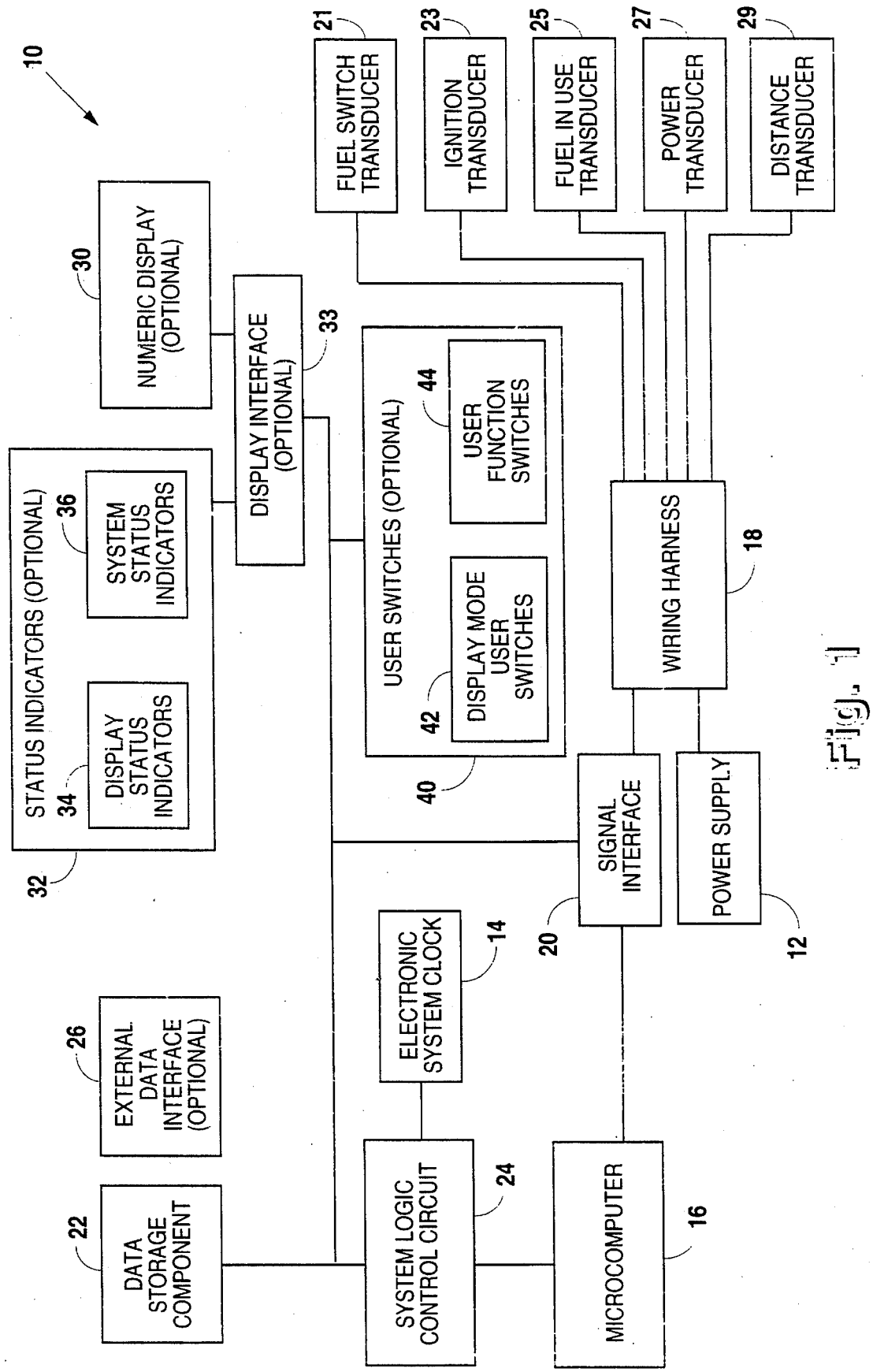
FIG. 1 is a block diagram of the elements of a preferred embodiment of the digital fuel usage tracking device of the present invention.
Figure 2:
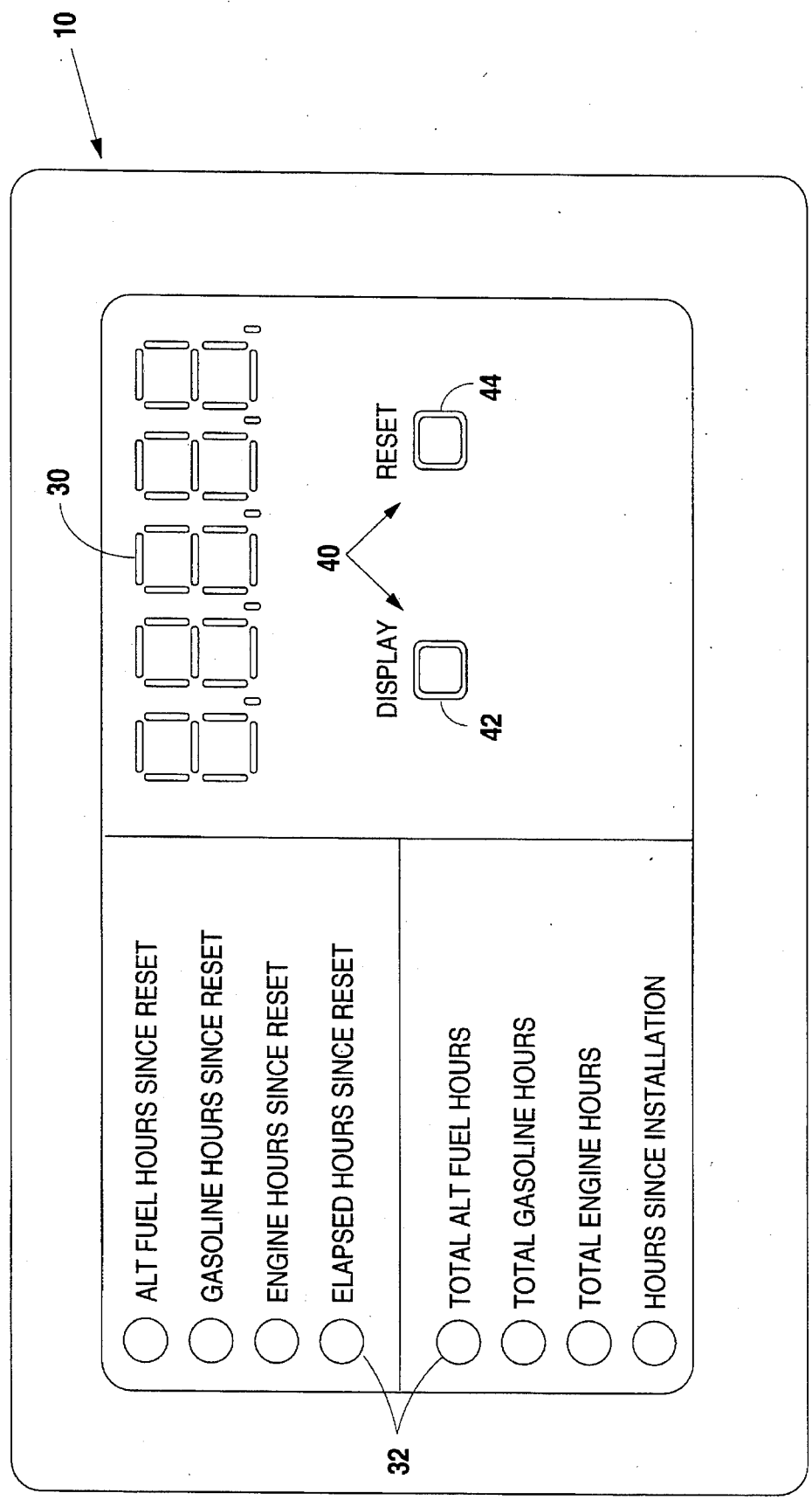
FIG. 2 is a plan view of a preferred embodiment of the present invention with a numeric display.

Reference is made to FIGS. 1 and 2 for a detailed description of the device of the present invention. FIG. 1 shows a block diagram of a first embodiment of the present invention for a basic digital fuel usage tracking device (10) for dual fuel vehicles made up of several components. The components include power supply (12) which may consist of an internal power source such as a battery, or may simply convert the vehicle's DC power to DC levels appropriate to run the components of the device (10). If such power conversion is to take place, power supply (12) must include voltage regulation, surge protection, filtering, and noise and transient suppression. Any other source of DC power known in the art may be used.

The next component disclosed by FIG. 1 is the electronic system clock (14) or timing oscillator. The electronic system clock (14) generates many pulses at regular intervals. The number of pulses generated by the electronic system clock (14) may be divided using a counter (not shown) at the output of clock (14) in order to regulate the number of pulses per minute to a level appropriate for use by device (10). This divided pulse signal is then fed into the microcomputer (16) and thereby serves as the timing base for the device (10). The stable synchronous timing signal of clock (14) is necessary for proper operation of the digital circuitry in the device (10). In addition, the electronic system clock (14) serves as the timing reference for the time-correlated measurement quantities detected by the device (10). The electronic system clock (14) may even be separated into two components, a digital system clock and an elapsed time measuring device.

The system clock (14) is connected to the microcomputer (16) through other digital circuitry (described below), and in effect tells the microcomputer (16) when to take another reading as to which fuel is currently being burned. The elapsed time measuring device component of the electronic system clock (14) provides the base for the timing data in hours and minutes of the type of fuel used.

The next component in the device is the wiring harness (18). It is through this component that the device (10) is physically and electrically connected to the appropriate parts of the vehicle for the device (10) to take proper measurements. The wiring harness (18) may be connected in such a way that various vehicle parameters may be measured. In the preferred embodiment, the wiring harness (18) will have a transducer (21) connected to the fuel selector switch on the vehicle. The fuel selector switch (not shown) may be manually set by the driver of the vehicle and determines which type of fuel the vehicle will run on. In addition, the wiring harness (18) is connected to the vehicle's ignition through another transducer (23). Whenever the vehicle's motor is running, the device (10) will be able to sense this condition through the connection to the vehicle ignition. A third transducer (25) connects the wiring harness (18) to the engine in order to determine which fuel the engine is burning.

By having connections to both the fuel selector switch and to the engine so as to determine which fuel is actually being burned, the device (10) is able to detect if the conditions are inconsistent and will register an error state. Such an error state thereby serves as an indication that the device (10) has been tampered with.

Other possible transducer connections (not shown) for the wiring harness (18) include the vehicle fuel pump, the carburetor, the odometer, the speedometer, the tachometer, and the vehicle transmission. In addition, the wiring harness (18) provides the electrical connection to the vehicle DC power (27) when the device (10) is run off of the vehicle's battery. Other combinations of connections to the vehicle, made by one skilled in the art, to indicate that the vehicle is running, which fuel the user has selected, which fuel the vehicle is burning, and the distance the vehicle has traveled may be used as input parameters to the device (10) through the wiring harness (18).

A mileage or distance traveled signal may be any input signal from transducer (29) whose period or frequency is representative of the distance traveled by the vehicle. As mentioned hereinabove, this may be obtained from the engine r.p.m. combined with the transmission state or from a speedometer connection. The fuel selection state as described above is an input signal from transducer (21) that indicates the state of the external switch used for user selection of the fuel. The fuel usage engine state is an input signal from transducer (25) which may be a single input or several inputs from sources in the vehicle such as the fuel injectors, fuel pump, and other sources, which indicate the nature of the current fuel being consumed by the engine.

The next component in the device (10) is the signal interface (20). The signal interface (20) is connected to the wiring harness (18) for receipt of the above described information concerning the current state of the vehicle. The various vehicle input signals as received by the wiring harness (18) are typically twelve volt signals which contain noise and distortion from other systems in the vehicle. The signal interface (20) provides opto-isolation of each vehicle signal received. Using infrared LEDs (not shown) to provide galvanic isolation, the vehicle input signals are converted to clean five volt logic signals for further processing by the device (10). The function of the signal interface (20) is to provide conversion, conditioning and isolation of the electrical and electronic signals input to the device (10) and may comprise any of a number of such commercially available A/D convertors.

The conditioned signals from the signal interface (20) are then fed into the microcomputer (16) of the device (10). The microcomputer (16) periodically reads the state of the monitored vehicle parameters. The electronic system clock (14) is connected to the microcomputer (16) and provides the timing base for the microcomputer (16) to make its periodic readings. The microcomputer (16) may be any type of solid state device commonly used in the art such as a microprocessor, microcontroller, or discrete digital circuitry which receives and either stores or processes the vehicle input signals, provides the necessary interface and output signals, and correlates the signals according to the various state combinations. The microcomputer (16) of the preferred embodiment interprets the digital logic signals from the signal interface (20) to produce as its output vehicle fuel use data based on the vehicle fuel currently in use.

In the preferred embodiment, every 3.6 seconds, the equivalent of $1/1000$ of an hour, the states of the fuel selector switch, the fuel being burned, and the ignition are read and the appropriate data registers are incremented. Each register holds the current value of a unique data parameter for the vehicle's fuel use. In the preferred embodiment, sixteen different parameters are monitored by the device. The first group of eight parameters measures time and the second group of eight parameters measures distance. Reference is again made to Table 1 for a summary of these parameters. The last four parameters of each group may not be reset by the user but rather are cumulative amounts measured from the installation of the device (10) in the vehicle for authentication and verification purposes.

Other embodiments of the current device (10) may be designed which only measure either the eight time parameters or, alternatively, the eight distance parameters. On the other hand, if the vehicle operates on more than two types of fuel, more than sixteen parameters may be measured and stored by the device (10), as needed. Any other time or distance parameters useful for monitoring purposes occurring to one skilled in the art may also be measured by the current device (10).

The next component of the device (10) shown in FIG. 1 is a data storage component (22). It is within the data storage component (22) that the parameters measured by the device (10) are stored. In the preferred embodiment, the data storage component (22) is a NOVRAM (Non-Volatile Random Access Memory) chip for recording the data. The non-volatile nature of the device ensures that the data stored within it is not lost due to a power failure when the vehicle battery is dead or removed. Several memory locations within the device are used for logging time parameters. In the preferred embodiment, sixteen different sets of data are kept. The NOVRAM consists of RAM (Random-Access Memory) overlaid with EEPROM (Electrically Erasable Programmable Read Only Memory). The data storage component (22) provides rewritable storage of data sent to it by the microcomputer (16). In addition, data that has been stored in the memory device (22) may be retrieved for display on a numeric display (30) or for downloading to an external device through interface (26).

The data storage component (22) is connected to the microcomputer (16) through the system logic control circuit (24). The function of the system logic control circuit (24) is to coordinate storage of the various parameters measured by the device (10) sent to it from the microcomputer (16) in the proper memory locations within the data storage component (22). The system logic control circuit (24) generates the chip select and read/write signals necessary to properly update the data storage component (22). In addition, the system logic control circuit (24) coordinates retrieval of data from the data storage component (22) for output to a display device (30) or for downloading externally through interface (26). The system logic control circuit (24) is also connected to the electronic system clock (14) to ensure proper coordination between the system logic control circuit (24) and the other components of the device (10). The functions of the system logic control circuit (24) may also be embedded within the logic of the microcomputer (16) as is well known in the art.

The device (10) in the preferred embodiment uses an external data interface (26) for rapidly uploading fuel use data to the data storage component (22) or downloading fuel use data from the data storage component (22). In the preferred embodiment, the external data interface (26) is an opto-electronic serial interface with an external infrared sending/receiving unit. Each device (10) employing the external data interface (26) will have a unique serial number programmed at installation of the device (10). This quantity will be downloaded with the data from the device (10) for security purposes. Any wireless communication-means may be used to implement the external data interface, including infrared, RF, and other wireless data communication methods known in the art.

Instead of a wireless interface, the external data interface (26) may also be connected to a download/upload external system through a cable. The interface may also permit parallel transmission of data. In the absence of the optional cumulative reset initiated by the user of the device (10), the cumulative reset may be triggered by the external data device through the external data interface (26). The external data interface (26) may be optical, electrical or electronic. It allows data to be uploaded for configuration and calibration and to be downloaded for remote storage.

Reference is now made to both FIG. 1 and to FIG. 2, which provides a plan view of the external front face of the device (10). In the preferred embodiment, the device (10) includes a numeric display (30) for user controlled display of any of the numeric values stored in the data storage component. Also included within the device (10) is the display interface (shown as (33) in FIG. 1) which provides an interface between the system visual indicators (30) and the internal digital components. Associated with the numeric display (30) are two sets of status indicators (32). The display status indicators (34) indicate which of the quantities measured by the device (10) and stored in the data storage component (22), is being shown on the numeric display (30). The system status indicators (36) indicate the condition of the various signals coming from the vehicle through the wiring harness (18) for measurement by the device (10). FIG. 1 and FIG. 2 also show user switches (40) which permit user input to the device (10). The display mode user switches (42) allow the user to select which quantity measured by the device (10) and stored in the data storage component (22), is currently displayed on the numeric display (30). The user function switches (44) permit the user to further control the device (10) by resetting the resettable quantities measured by the device (10) and stored in data storage component (22).

The user switches (40) can be any switches commonly used in the art. In the preferred embodiment, the switches (40) are normally open and the contacts close when the switch is depressed. For purposes of accuracy, the microcomputer (16) polls the condition of a switch several times before it sends a signal that the switch has been activated.

While the preferred embodiment for the present invention includes many elements for interaction with the operator of the vehicle (numeric display, status indicators, and user switches), the device may also operate without such user interaction. For example, the device (10) may be built without any of the visual indicators (30) and (32) on it and may even be located entirely hidden from the vehicle operator's view. When operated in this manner, the device (10) may simply have its stored data read through the external data interface (26) for determination and verification of the types of fuel burned by the vehicle.

It is intended that the above descriptions of the preferred embodiments of the structure of the present invention and the description of its mounting locations are but two enabling best mode embodiments for implementing the invention. Other applications are likely to be conceived of by those skilled in the art, which applications still fall within the breadth and scope of the disclosure of the present invention. The primary import of the present invention lies in its continuous monitoring and recording of the type of fuel burned by the vehicle. Its benefits derive from its low cost and accuracy. Again, it is understood that other applications of the present invention will be apparent to those skilled in the art upon a reading of the preferred embodiments and a consideration of the appended claims and drawings.

We claim:

1. A device for tracking fuel usage in a vehicle operating on multiple types of fuel, said device capable of interfacing with a vehicle fuel selector switch, the vehicle engine and the vehicle ignition system, the device comprising:

a power supply;

an electronic system clock;

a digital data storage component;

a first means for detecting a fuel type condition indicative of the type of fuel being burned by said vehicle;

a second means for detecting a motor running condition;

a signal interface connected to said first and second detecting means, said signal interface capable of receiving signals from said detecting means and generating digital logic signals for said fuel type condition and said motor running condition;

a microcontroller connected to said electronic system clock, said signal interface and said data storage component, said microcontroller programmed to receive and interpret said digital logic signals from said signal interface to produce fuel use data and to coordinate storage of said fuel use data in said data storage component and retrieval of said stored fuel use data from said data storage component; and an external data interface connected to said microcomputer for communicating said fuel use data between said data storage component and an external source.

2. The device of claim 1, wherein said microcontroller further comprises:

a microcomputer connected to said electronic system clock and to said signal interface and programmed to receive and interpret said digital logic signals from said signal interface to produce fuel use data; and a system logic control circuit connected to said microcomputer and to said electronic system clock, said system logic control circuit also connected to said data storage component for coordinating storage of said fuel use data in said data storage component and retrieval of said stored fuel use data from said data storage component.

3. The device of claim 1, wherein said first detecting means is connected to said fuel selector switch.

4. The device of claim 1, wherein said second detecting means is connected to the carburetor of said vehicle.

5. The device of claim 2 further comprising a numeric display connected to said system logic control circuit.

6. The device of claim 5 further comprising a user selection switch for controlling the contents of said numeric display.

7. The device of claim 1, wherein said power supply is a dedicated internal battery.

8. The device of claim 1, wherein said power supply converts DC power from said vehicle and further comprises a voltage regulator.

9. The device of claim 1 further comprising a user selection switch for resetting any of said fuel use data stored in said data storage component.

10. The device of claim 1, wherein said fuel use data includes a plurality of time parameters, said time parameters including:

(a) a motor running with a first fuel selection condition time period since a last reset;

(b) a motor running with a second fuel selection condition time period since a last reset;

(c) a motor running condition time period since a last reset of said time parameters;

(d) a time period since a last reset;

(e) a cumulative motor running with a first fuel selection condition time period;

(f) a cumulative motor running with a second fuel selection condition time period;

(g) a cumulative motor running condition time period; and (h) a cumulative time period since said device installation in said vehicle.

11. The device of claim 1, further comprising a third means for detecting a distance traveled by said vehicle and wherein said fuel use data includes a plurality of distance parameters, said parameters including:

(a) a distance traveled with a first fuel selection condition since a last reset;

(b) a distance traveled with a second fuel selection condition since a last reset;

(c) a distance traveled since a last reset of said distance parameters;

(d) a total distance traveled since a last reset;

(e) a cumulative distance traveled with a first fuel selection condition;

(f) a cumulative distance traveled with a second fuel selection condition; and (g) a cumulative distance traveled since said device installation in said vehicle.

12. A device for tracking fuel usage in a vehicle operating on multiple types of fuel, said device capable of interfacing with a vehicle fuel selector switch, the vehicle ignition system, and the vehicle engine, the device comprising:

a power supply;

an electronic system clock;

a digital data storage component;

a first means for detecting a condition of said fuel selector switch;

a second means for detecting a motor running condition;

a third means for detecting the type of fuel being burned by said vehicle;

a signal interface connected to said first, second, and third detecting means, said signal interface capable of receiving signals from said detecting means and generating digital logic signals for said fuel selector switch condition, said motor running condition and said type of fuel burned condition;

a microcomputer connected to said electronic system clock and to said signal interface and programmed to receive and interpret said digital logic signals from said signal interface to produce fuel use data;

a system logic control circuit connected to said microcomputer and to said electronic system clock, said system logic control circuit also connected to said data storage component for coordinating storage of said fuel use data in said data storage component and retrieval of said stored fuel use data from said data storage component;

an external data interface connected to said microcomputer for communicating said fuel use data between said data storage component and an external source;

a numeric display connected to said system logic control circuit;

a first user selection switch for controlling the contents of said numeric display; and a second user selection switch for resetting any of said fuel use data stored in said data storage component.

* * * * *